H. H. DOW.
METHOD OF RECOVERING BROMIN.
APPLICATION FILED JULY 10, 1916.
1,354,472. Patented Oct. 5, 1920.
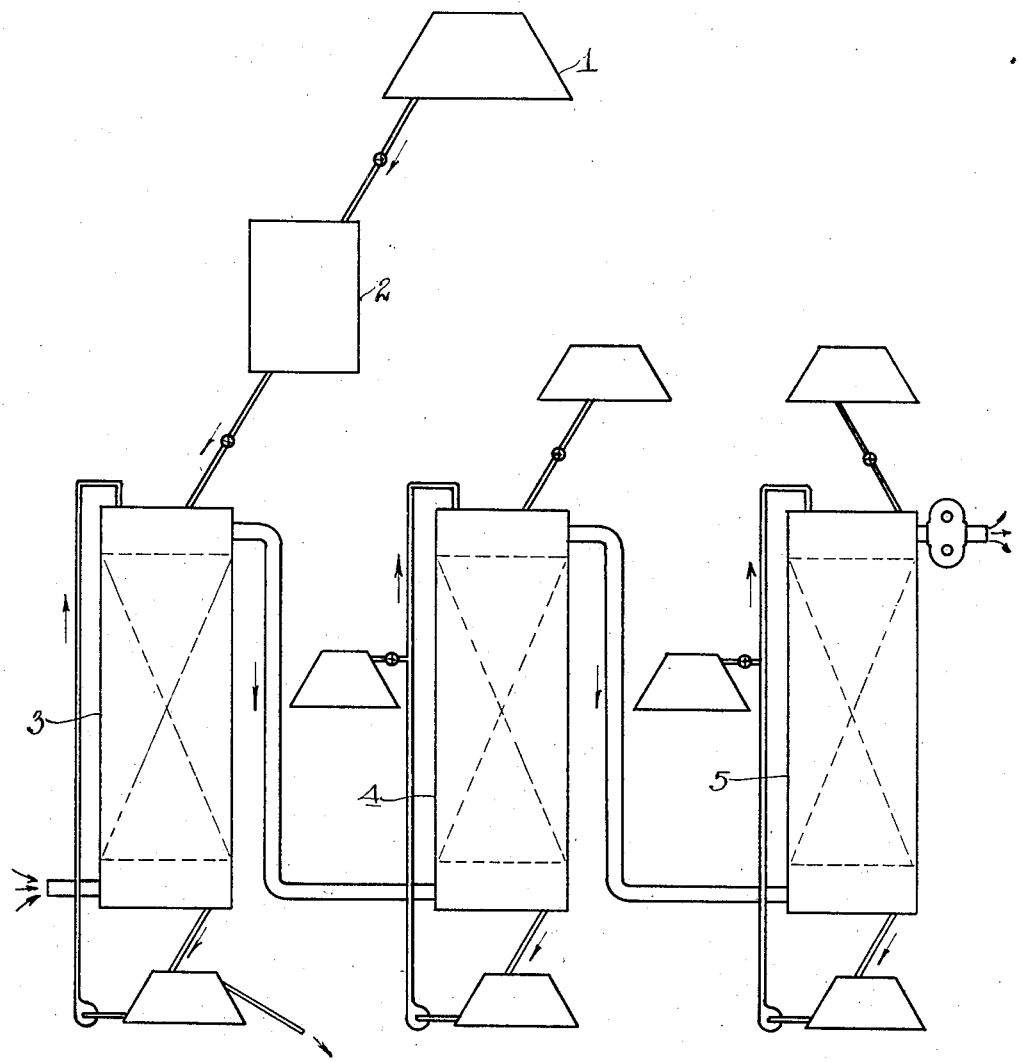
WITNESSES
OM Kappler
Thos. H Fay
INVENTOR
HERBERT H. DOW.
BY Fay, Oberlin & Fay
ATTORNEYS

UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

METHOD OF RECOVERING BROMIN.

1,354,472.   Specification of Letters Patent.   Patented Oct. 5, 1920.

Application filed July 10, 1916. Serial No. 108,291.

*To all whom it may concern:*

Be it known that I, HERBERT H. DOW, a citizen of the United States, and a resident of Midland, county of Midland, and State of Michigan, have invented a new and useful Improvement in Methods of Recovering Bromin, of which the following is a specification, the principle of the invention being herein explained and the best mode in which I have contemplated applying that principle so as to distinguish it from other inventions.

In U. S. Letters Patent Re. No. 11,232, issued to me April 12th, 1892, a process is described and claimed for extracting bromin from natural brines, in which the brine is treated to set such bromin free from its chemical combination, whereupon it goes into solution in the brine, and then is recovered from such solution by an air blast, being finally absorbed from the gaseous mixture with suitable absorbing material. The treatment of the brine to free the bromin is generally referred to as an oxidation step, and as stated in the patent in question, may be accomplished electrolytically or by the agency of chlorin gas, or by other means. Particularly where the bromin is electrolytically freed, there will also be incidentally freed more or less chlorin, due to the oxidation of the chlorids which are also present in the brine and in larger amount than the bromids.

Accordingly, it has become necessary, in practically carrying out the aforesaid process, to eliminate such chlorin from the gaseous mixture resulting from blowing out the brine in the manner described, preliminarily to absorbing the bromin in such mixture. Otherwise, the bromin salts will be largely contaminated with chlorin salts, which is highly undesirable.

As one practical way for thus eliminating the chlorin, air from the blowout tower with admixed bromin and chlorin, has been brought into contact with bromids derived either from the final product of the operation or independently, which take up such chlorin, forming chlorids and freeing a corresponding additional amount of bromin. The latter is then absorbed, along with the proper content of bromin coming over from the blowout tower, in a final so-called "absorption tower," where alkaline carbonate is preferably utilized in accordance with the teaching of Patents Nos. 765,417 and 765,418, issued to me under date of July 19, 1904.

The present improved process has as its object the absorption of the chlorin by a suitable selective absorbing agent, preferentially reacting therewith so as to avoid the use of the bromids with consequent loss of efficiency, since obviously such use amounts merely to unmaking product previously made, and then again absorbing the additional bromin produced.

To the accomplishment of the foregoing object, the invention then consists of the steps hereinafter described and particularly pointed out in the claims, the annexed drawing and the following description setting forth in detail one mode of carrying out the invention, such disclosed mode, however, constituting but one of various ways in which the principle of the invention may be used.

In said annexed drawing, the single figure there appearing represents diagrammatically a form of apparatus suitable for use in carrying out my present improved process.

It will be understood that for the purpose of the present description, the apparatus is shown in its simplest form, eliminating various features which in practice may be found desirable, such for example, as those shown and described in U. S. Letters Patent 714,160 issued to me November 25, 1902.

As illustrated accordingly, the apparatus comprises simply a suitable reservoir 1 for the brine, from which it is adapted to be fed directly to the oxidizing tank 2, wherein the oxidizing step is carried out as previously explained. From such oxidizing apparatus the brine is then led into a blowout tower 3, to which a blast of air is supplied at the bottom so as to meet the downward descending brine and extract therefrom the free bromin, as well as any other gas, including the incidentally freed chlorin.

The resulting gaseous mixture is next conducted to the bottom of a chlorin absorption tower 4, in place of a purification tower as heretofore. This tower is of typical construction, being in all respects similar to such purification tower except that instead of supplying a solution of bromid to it, a solution of some suitable selective absorbing agent is thus supplied, i. e. circulated through the tower or else such agent is placed in the tower itself in sufficiently diffuse condition to react in the desired manner. As suitable for use in the form of a solution, lime water may be named, or a slightly alkaline halide solution *e. g.* a solution containing chlorid and bromid, that is, a solution of the latter containing a little sodium carbonate; and as an agent suitable for placing in the tower, metallic iron may be named.

The reagent for absorbing the chlorin is provided in quantity approximately sufficient to take up all of the chlorin present in the gaseous mixture, and being dilute or diffuse, as stated, will react therewith in preference to the bromin. Some of the bromin may also be absorbed, and the resulting product may be worked for the recovery of liquid bromin, for example, but will not be sufficiently pure for the market as bromid. The mixture passing from this tower to the final absorption tower 5, will be practically entirely free of chlorin, and hence, the product resulting from this tower at least will be sufficiently chemically pure to comply with pharmaceutical requirements. It is understood that an alkaline carbonate such as potassium carbonate, is preferably used as the absorbing agent in such last-named tower.

In the apparatus as shown and described, the air is passed through in an open circuit, being discharged again into the open from such final bromin-absorbing tower.

Other modes of applying the principle of my invention may be employed instead of the one explained, change being made as regards the method herein disclosed, provided the step or steps stated by any one of the following claims or the equivalent of such stated step or steps be employed.

I therefore particularly point out and distinctly claim as my invention:—

1. The method of recovering bromin from a gaseous mixture also containing chlorin, which consists in selectively absorbing such chlorin with a reagent other than a bromid, substantially as described.

2. The method of recovering bromin from a gaseous mixture also containing chlorin, which consists in treating such mixture with an absorbing agent, other than a bromid, that preferentially combines with chlorin.

3. The method of recovering bromin from a gaseous mixture also containing chlorin, which consists in treating such mixture with an absorbing agent, other than a bromid, that preferentially combines with chlorin, such agent being provided in quantity approximately sufficient to take up all of the chlorin present.

4. The method of recovering bromin from a gaseous mixture also containing chlorin, which consists in treating such mixture with a slightly alkaline solution, the alkali being provided in quantity approximately sufficient to take up all of the chlorin present and sufficiently diffuse to react therewith in preference to the bromin.

5. The method of recovering bromin from a gaseous mixture also containing chlorin, which consists in treating such mixture with a dilute solution of sodium carbonate, the latter being provided in quantity approximately sufficient to take up all of the chlorin present and sufficiently diffuse to react therewith in preference to the bromin.

Signed by me, this 6th day of July, 1916

HERBERT H. DOW.

Attested by—
A. N. PATRIARCHE,
JNO. F. OBERLIN.